United States Patent
Barrett

(10) Patent No.: US 7,962,938 B2
(45) Date of Patent: Jun. 14, 2011

(54) SPECIALIZED MEDIA PRESENTATION VIA AN ELECTRONIC PROGRAM GUIDE (EPG)

(75) Inventor: Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1440 days.

(21) Appl. No.: 10/833,709

(22) Filed: Apr. 27, 2004

(65) Prior Publication Data

US 2005/0240964 A1    Oct. 27, 2005

(51) Int. Cl.
    *G06F 3/00* (2006.01)
(52) U.S. Cl. ............... 725/51; 725/41; 725/43; 725/44; 725/45; 725/112; 725/109
(58) Field of Classification Search .............. 725/132, 725/51, 53
    See application file for complete search history.

(56) References Cited

U.S. PATENT DOCUMENTS

| | | | |
|---|---|---|---|
| 5,809,471 A | | 9/1998 | Brodsky |
| 5,859,662 A | | 1/1999 | Cragun et al. |
| 6,025,837 A | | 2/2000 | Matthews, III et al. |
| 6,072,483 A | * | 6/2000 | Rosin et al. ................ 715/716 |
| 6,154,771 A | | 11/2000 | Rangan et al. |
| 6,184,877 B1 | | 2/2001 | Dodson et al. |
| 6,263,501 B1 | | 7/2001 | Schein et al. |
| 6,564,383 B1 | | 5/2003 | Combs et al. |
| 6,976,028 B2 | * | 12/2005 | Fenton et al. ............... 707/102 |
| 7,194,698 B2 | * | 3/2007 | Gottfurcht et al. ........... 715/811 |
| 2001/0003214 A1 | | 6/2001 | Shastri et al. |
| 2002/0157100 A1 | | 10/2002 | Kitsukawa et al. |
| 2003/0031207 A1 | | 2/2003 | Upadhya |
| 2003/0226147 A1 | * | 12/2003 | Richmond et al. ............ 725/51 |
| 2003/0229900 A1 | * | 12/2003 | Reisman ........................ 725/87 |
| 2007/0044010 A1 | * | 2/2007 | Sull et al. ................... 715/500.1 |

FOREIGN PATENT DOCUMENTS

| | | |
|---|---|---|
| CN | 1453998 | 11/2003 |
| CN | 1533164 | 4/2008 |

(Continued)

OTHER PUBLICATIONS

Chung-Sheng Li et al., "Multimedia Content Description in the InfoPyramid," Proceedings of the 1998 IEEE Int'l. Conference on Acoustics, Speech & Signal Processing, ICASSP '98 (May 12-15, 1998), Part vol. 6, pp. 3789-3792.

(Continued)

Primary Examiner — Joseph P Hirl
Assistant Examiner — Jivka Rabovianski
(74) Attorney, Agent, or Firm — Lee & Hayes, PLLC

(57) ABSTRACT

An electronic program guide (EPG) is enhanced to have entries that enable access to one or more images. When an image-related entry is selected by a user, a television-based device presents the one or more images that are associated with the selected entry. In a described search-related implementation, portions of the EPG, such as actors and actresses names, are presented as links. Selection of a link effectuates a search of a group of files and is followed by the visual presentation of a slide show of images resulting from the search. In a described email-related implementation, a third party can email images to an email address that is associated with the television-based device. In response to the emailed images, an image entry is added to the channel lineup of the EPG. Selection of the image entry causes the device to visually present the emailed images in a slide show.

26 Claims, 6 Drawing Sheets

FOREIGN PATENT DOCUMENTS

| | | |
|---|---|---|
| WO | WO0118658 A | 3/2001 |
| WO | WO0174062 A | 10/2001 |
| WO | WO03021947 A | 3/2003 |

OTHER PUBLICATIONS

Andrew Tokmakoff et al., "Home Media Server content management," Internet Multimedia Management Systems II, Proceedings of SPIE, Aug. 22-23, 2001, vol. 4519, pp. 168-179.

Lawrence A. Rowe et al., "Indexes for User Access to Large Video Databases," Proceedings of the SPIE—Int'l. Society for Optical Engineering, Feb. 7-8, 1994, vol. 2185, pp. 150-161.

European Search Report for European Patent Application No. 05102832.2 Mailed on Oct. 9, 2007, 6 pgs.

Official Notice of Rejection for China Patent Application No. 200510068981.4 Mailed on Jan. 4, 2008, 17 pgs.

\* cited by examiner

SPECIALIZED MEDIA PRESENTATION VIA AN ELECTRONIC PROGRAM GUIDE (EPG)

TECHNICAL FIELD

This disclosure relates in general to the specialized presentation of media via one or more television applications and in particular, by way of example but not limitation, to specially presenting media responsive to user selection of linked entries of an electronic program guide (EPG).

BACKGROUND

Many images are available over the Internet from many different sources. In fact, the number of images being posted on web sites for public access increases daily. Furthermore, individuals email thousands if not millions of images daily to selected friends and family. Personal computers are designed to present these images to users. For example, personal computers are usually capable of displaying web pages at a sufficiently high resolution to enable a user to view many items at once. Personal computers also typically include robust email programs with multiple option settings for conveniently receiving emailed images. Moreover, and perhaps most importantly, users of personal computers accept if not expect a relatively high degree of complexity when operating their personal computers, including when accessing images over the Internet.

Users of television set-top boxes, on the other hand, expect if not demand a relatively-low degree of complexity when operating their set-top boxes. Although some devices using a television for display have previously offered the ability to access email, consumers have been generally averse to engaging in the complexity of email with their televisions while resting on their living room couch with their remotes. Furthermore, television users have not been receptive to using their relatively-low resolution televisions for exploring the Internet.

Accordingly, there is a need for schemes and/or techniques that can enable television users to have access to and enjoy the many images that are available over the Internet from various sources in an extensive and/or convenient manner.

SUMMARY

An electronic program guide (EPG) is enhanced to have entries that enable access to one or more images (or media generally). When an image-related entry is selected by a user, a television-based device presents the one or more images that are associated with the selected entry. In a described search-related implementation, portions of the EPG, such as actors and actresses names, are presented as links. Selection of a link effectuates a search of a group of files (e.g., using a search service such as a third party search engine from the Internet) and is followed by the visual presentation of a slide show of images resulting from the search. In a described email-related implementation, a third party can email images to an email address that is associated with the television-based device. In response to the emailed images, an image entry is added to the channel lineup of the EPG. Selection of the image entry causes the device to visually present the emailed images in a slide show.

Other method, system, approach, apparatus, server, client, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Television-based devices, such as set-top boxes, receive television signals by cable, satellite, traditional antennas, and so forth. The received television signals are displayed on a display screen. Especially because of the multitude of channels that are available today, such television-based devices often include an electronic program guide (EPG).

EPGs typically present a listing of programs that may be viewed by a user as cross referenced by the scheduled viewing time. EPGs also frequently include entries for pay-per-view programs. Programs can be located by title, subject, broadcast time, and so forth. When a user selects a program from the EPG, a description of the selected program is presented on the display screen.

In a described implementation, the EPG is enhanced to have entries that enable access to one or more images. When an image-related entry is selected by a user, the television-based device presents the one or more images that are associated with the selected entry.

In a described search-related implementation, portions of the EPG, such as actors and actresses names, are presented as links. Selection of a link initiates a search of a group of files. This group of files may be those files (e.g., web pages) indexed by a search service such as a third party search engine that is accessible via the Internet. Search results in a first format from the search service are scrubbed to produce scrubbed search results in a second, more accessible format. Images from the scrubbed search results in the second format may then be presented visually in a slide show.

In a described email-related implementation, a third party can email images to an email address that is associated with the television-based device. In response to the emailed images, an image entry is added to the channel lineup of the EPG. Selection of the image entry causes the device to retrieve the emailed images and visually present the retrieved images in a slide show.

Example of Environment for Specialized Media Presentation via an EPG

Figure 1:
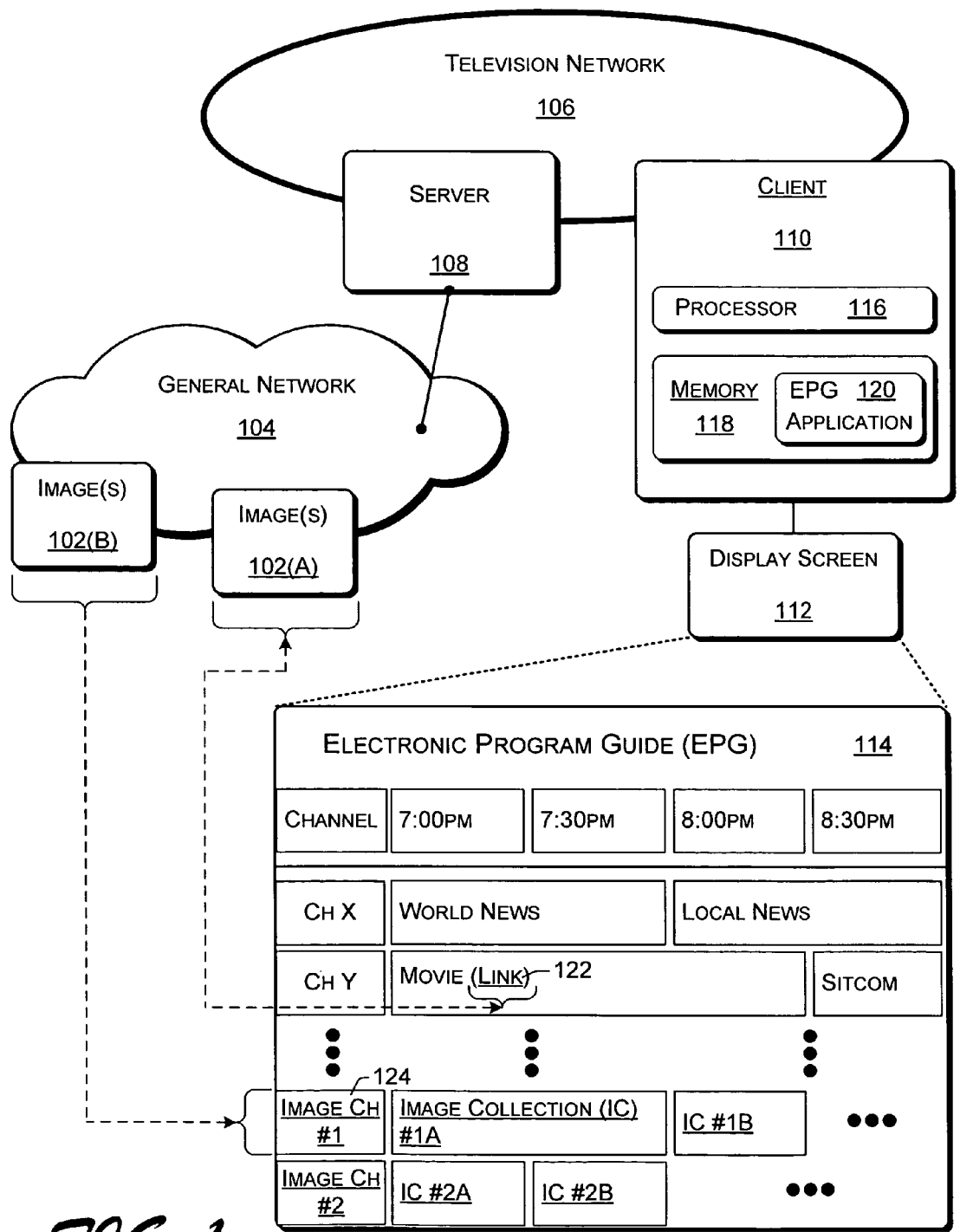
FIG. 1 is a block diagram illustrating examples of image access over a general network at a television-based device via an electronic program guide (EPG).

FIG. 1 is a block diagram illustrating examples of image 102 access over a general network 104 at a television-based device 110 via an EPG 114. General network 104 includes or otherwise provides access to multiple images 102. General network 104 may be, for example, the internet. A server 108 is coupled to general network 104.

Server 108 is part of television network 106. In a described implementation and as illustrated, television network 106 comprises a cable network. However, television network 106 may alternatively be realized as a satellite network, a transmission-tower-type network, and so forth. Furthermore, television network 106 may optionally include multiple servers 108, multiple peer or hierarchical nodes, multiple content distribution levels, and so forth.

Coupled to television network 106 is a television-based device that is realized as client 110. Client 110 receives television content from server 108 through television network 106. Such television content is displayed by client 110 on display screen 112. Display screen 112 may be integral with or merely connected (wirelessly or by wire) to client 110.

Client 110 includes one or more processors 116 and at least one memory 118. Memory 118 includes processor-executable instructions that are executable by processor 116 to effectuate functions of client 110. Memory 118 may be realized as volatile or nonvolatile memory. More generally, client 110 may include and/or be coupled to media generally (e.g., electromagnetic or optical media) that may be volatile or non-volatile media, removable or non-removable media, storage or transmission media, some combination thereof, and so forth.

Memory 118 includes an EPG application 120, which may comprise processor-executable instructions. More generally, EPG application 120 may comprise hardware, software, firmware, or some combination thereof, and so forth. EPG application 120 is capable of establishing and presenting EPG 114. EPG application 120 is also capable of updating the EPG in response to communications from server 108 and of modifying the displayed portion of the EPG in response to user input. Although not explicitly shown, client 110 is capable of accepting user input (e.g., from a remote, a keyboard, a gyroscopic device, etc.).

As illustrated in FIG. 1, EPG 114 includes multiple entries. These entries include channel entries, individual cells, particular fields, and linked symbols. Typically, but not exclusively, linked symbols are alphanumeric characters. An example of an alternative linked symbol is a representative emblem or a geometric shape (e.g., a bullet point that is proximate to a word). With regard to channel entries, television channels "X" and "Y" and image channels #1 and #2 are shown in EPG 114.

Each channel entry corresponds to a horizontal row in EPG 114. However, channels may alternatively be organized into vertical columns or in some other manner. Each channel entry can include multiple cell entries, with each individual cell entry corresponding to a viewable program for television channels and to a viewable image collection (IC) for image channels. Selection of a program cell entry for a television channel can activate presentation of a detailed description of the selected program and/or presentation of the selected program itself.

In accordance with a search-related implementation, a link 122 is included in a movie cell for channel "Y". Link 122 provides access to images 102(A) that are acquired as a result of a search that is conducted responsive to link 122. In other words, upon selection of link 122 by a user, images 102(A) that are related to link 122 are acquired from general network 104 with a search of a group of files thereof and then presented on display screen 112 by client 110. This search-related implementation, which involves two-way communication with general network 104 after user selection of link 122 as indicated by the double arrows, is described further below in a section entitled "Image Access via an EPG in conjunction with a Search" and with reference to FIGS. 2 and 3.

In accordance with an email-related implementation, a cell-level or link 124 corresponding to image channel #1 is selectable by a user to provide access to images 102(B), which have been previously emailed to an email address that is associated with client 110. Upon selection by a user of entry 124 for image channel #1, images 102(B) are retrieved by client 110 and then presented on display screen 112. This email-related implementation, which involves one-way "quasi-push" communication over general network 104 prior to user selection of link 122 as indicated by the single arrow, is described further below in a section entitled "Image Access via an EPG in conjunction with an Email" and with reference to FIGS. 4 and 5.

Image Access via an EPG in Conjunction with a Search

Figure 2:
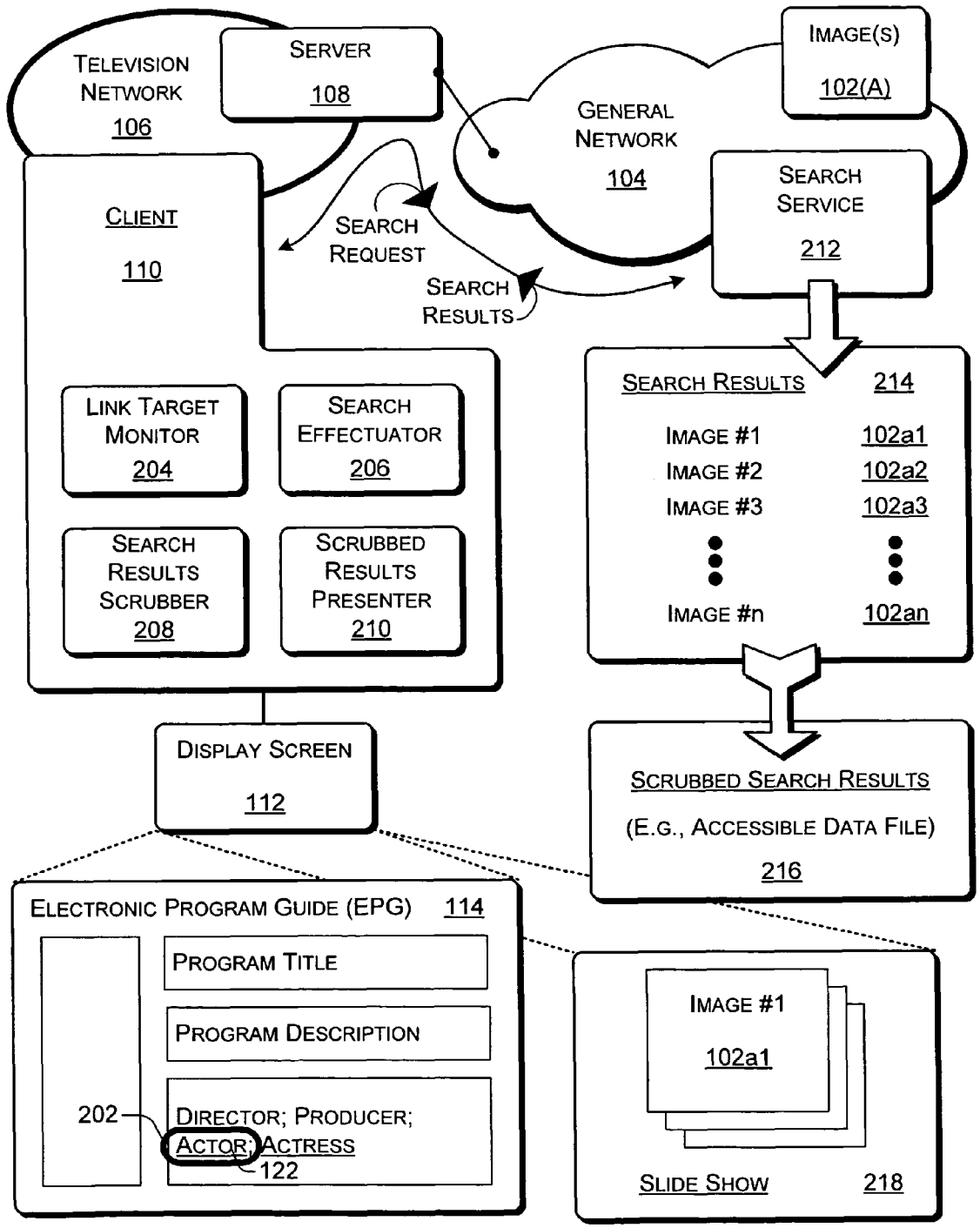
FIG. 2 is a block diagram illustrating an example of image access via the EPG in conjunction with a search.

FIG. 2 is a block diagram illustrating an example of image access via EPG 114 in conjunction with a search. EPG 114 is shown in a detailed program description mode in which details of a program are provided to a user. Such details include program title, program description, and artistic contributors, such as a director, a producer, an actor, an actress, and so forth.

As illustrated, "actor" and "actress" are links as indicated by the underline formatting. Alternatively, hyper-linking may be indicated using bold formatting, differently-colored letters, a proximate symbol, some combination thereof, and so forth. Although only "actor" and "actress" are indicated as links in FIG. 2, any aspect of the detailed program description may be so indicated. The actor link 122 is indicated as having a selector pointing to it. Specifically, a selector ring 202 is shown. Other alternative selectors include an arrow or other pointer, a cursor, highlighting/inverse video, and so forth.

In a described implementation, client 110 includes a link target monitor 204, a search effectuator 206, a search results scrubber 208, and a scrubbed results presenter 210. These components may be components stored on memory 118 (of FIG. 1) and functional in conjunction with processor 116. Link target monitor 204 monitors EPG 114 to track the location of selector ring 202 and to detect when a link target, such as "actor", is being selected by a user with an input device. Link target monitor 204, in particular, may be part of EPG application 120.

After a link has been selected by a user as detected by link target monitor 204, search effectuator 206 causes a search to be performed. Generally, search effectuator 206 initiates a search on a group of files responsive to the selected link. More specifically, search effectuator 206 formulates a search request that uses the link target, including a portion thereof, as a keyword in the search. The search may be performed by any entity, including client 110, on any group of files that are accessible over television network 106 or general network 104.

In a described implementation, however, the search is performed by a search service 212, such as a third party search engine. Examples of such search engines include: Google™, Yahoo®, MSN® Search, and so forth. Search effectuator 206 formulates a search request for the intended search service 212 and transmits the search request to search service 212. For example, search effectuator 206 may formulate a search request such as 'http://SearchServiceName.com/search? . . . keyword="actor"' and then send the search request across television network 106 via server 108 and thence to search service 212 over general network 104. If available at the intended search service 212, search effectuator 206 may also indicate that an image search is being requested so that returned search results already focus on images of the search target.

Search service 212 performs a search responsive to the search request received from search effectuator 206 on the group of files that search service 212 has indexed. This group of files may be, for example, a significant portion of the web pages that are available on general network 104. After performing the requested search to locate images 102(A), search service 212 produces search results 214.

Search results 214 includes a number of individual images 102a. As illustrated, search results 214 includes "n" images 102a (i.e., image #1 102a1, image #2 102a2, image #3 102a3 . . . image #n 102an). Search results 214 is sent back or returned to client 110 over general network 104 and across television network 106 via server 108. Search results 214 is provided to client 110 from search service 212 in a format that is not readily presentable by client 110 on display screen 112, at least not in a user-friendly manner.

For example, search results 214 may be in a hypertext markup language (html) format. A television user does not typically want to see a list of uniform resource locators (URLs). Furthermore, if search results 214 contains thumbnails of images 102(A), such thumbnails are likely unviewable on a television's relatively low-resolution display screen 112 by a user sitting several feet distant therefrom.

Consequently, search results scrubber 208 accepts search results 214 (e.g., from search effectuator 206) and scrubs search results 214 to produce scrubbed search results 216. Scrubbed search results 216 may be produced from search results 214 by parsing search results 214 and then transforming the parsed search results into a different format (e.g., a data file that is readily accessible by EPG application 120). Generally, search results 214 may be parsed to extract the desired parts thereof; specifically, search results 214 may be parsed by looking at textual clues as to the contents of included images or links to images. An example of such parsing and transforming is screen scraping of an html document.

An html document, for example, may be parsed according to image tags. The parsed search results are then transformed into another format such as an extensible markup language (XML) format. An XML document comprising scrubbed search results 216 that results from a scrubbing of search results 214 by search results scrubber 208 may be as follows:

```
<slideshow>
    <image #1 URL='_'>
    <image #2 URL='_'>
    <image #3 URL='_'>
    ...
    <image #n URL='_'>
</slideshow>.
```

Regardless of the specific format of scrubbed search results 216 as produced by search results scrubber 208, scrubbed results presenter 210 accepts scrubbed search results 216 and presents them on display screen 112. For example, scrubbed results presenter 210 may present scrubbed search results 216 as a slideshow 218. In a slideshow 218, the user may be given the ability to manually flip through images 102a (in either direction), to adjust an automatic image replacement speed, to scroll rapidly through images 102a, and so forth. Other image presentation mechanisms may alternatively be employed by scrubbed results presenter 210.

Figure 3:
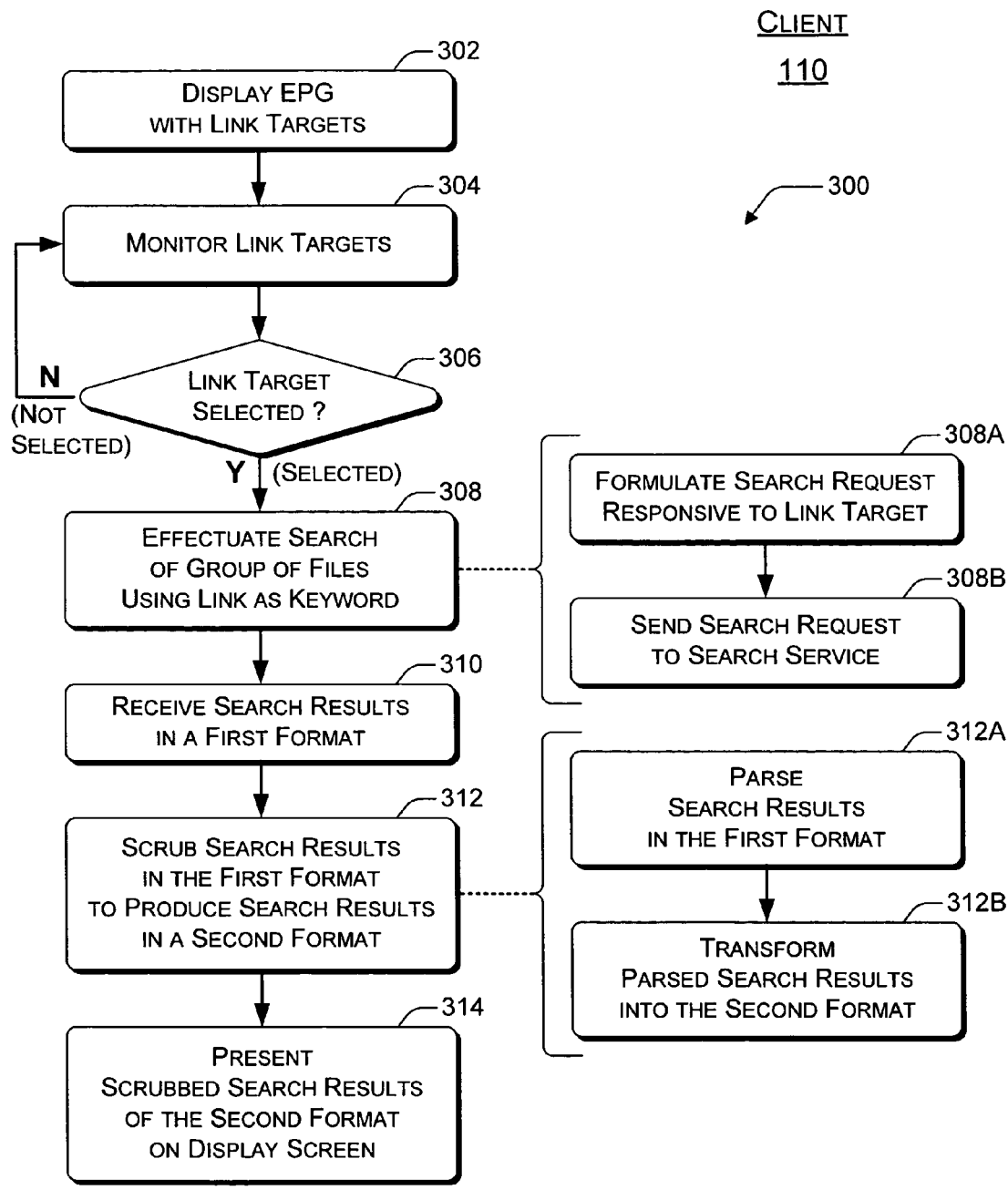
FIG. 3 is a flow diagram that illustrates an example of a method for accessing images via an EPG in conjunction with a search.

FIG. 3 is a flow diagram 300 that illustrates an example of a method for accessing images via an EPG in conjunction with a search. Flow diagram 300 includes seven (7) primary blocks 302-314 and eleven (11) blocks total. Although the actions of flow diagram 300 may be performed in other environments and with a variety of hardware and software implementations, FIGS. 1 and 2 are used in particular to illustrate certain aspects and examples of the method. For example, a client 110 may perform the actions of blocks 302-314.

At block 302, an EPG including link targets is displayed. For example, client 110 may display EPG 114 having link 122 with a link target of "actor" on display screen 112.

At block 304, link targets are monitored. For example, link target monitor 204 may monitor link targets of EPG 114 by tracking a selector such as selector ring 202 and awaiting a user selection. At block 306, it is detected if a link target has been selected. For example, link target monitor 204 may detect if a user selects a link 122. If no link target has been selected, then monitoring continues at block 304 as long as links 122 are present on a displayed EPG 114. If, on the other hand, a link target has been selected (as detected at block 306), flow diagram 300 continues with block 308.

At block 308, a search of a group of files is effectuated using the link target as a keyword. For example, search effectuator 206 may effectuate a search with a search service 212 using the selected link target as a keyword in the search. More specifically, at block 308A, a search request is formulated responsive to the link target. For example, search effectuator 206 may formulate a search request using "actor", including a part of the full name of the actor, as a keyword that is the target of the search.

At block 308B, the formulated search request is sent to a search service. For example, the search request may be sent from search effectuator 206 of client 110 over television network 106 via server 108 and over general network 104 to an intended search service 212. Selection of the intended search service 212 and/or formulation of the search request can determine, at least partially, the constituency of the group of files to be searched.

At block 310, search results in a first format are received. For example, search results 214 in a first format such as html may be received from search service 212 at search effectuator 206 of client 110.

At block 312, the search results in the first format are scrubbed to produce search results in a second format. For example, search results 214 in a first format such as html may be scrubbed by search results scrubber 208 to produce scrubbed search results 216 in as second format such as xml. More specifically, at block 312A, the search results in the first format are parsed. For example, search results scrubber 208 may parse search results 214 in the first format such as html to produce parsed search results. At block 312B, the parsed search results are transformed into the second format. For example, search results scrubber 208 may transform the parsed search results into scrubbed search results 216 (e.g., parsed and transformed search results) in the second format such as xml.

At block 314, the scrubbed search results of the second format are presented on a display screen. For example, scrubbed results presenter 210 may present scrubbed search results 216 on display screen 112 using a slideshow 218 mechanism.

Image Access via an EPG in Conjunction with an Email

Figure 4:
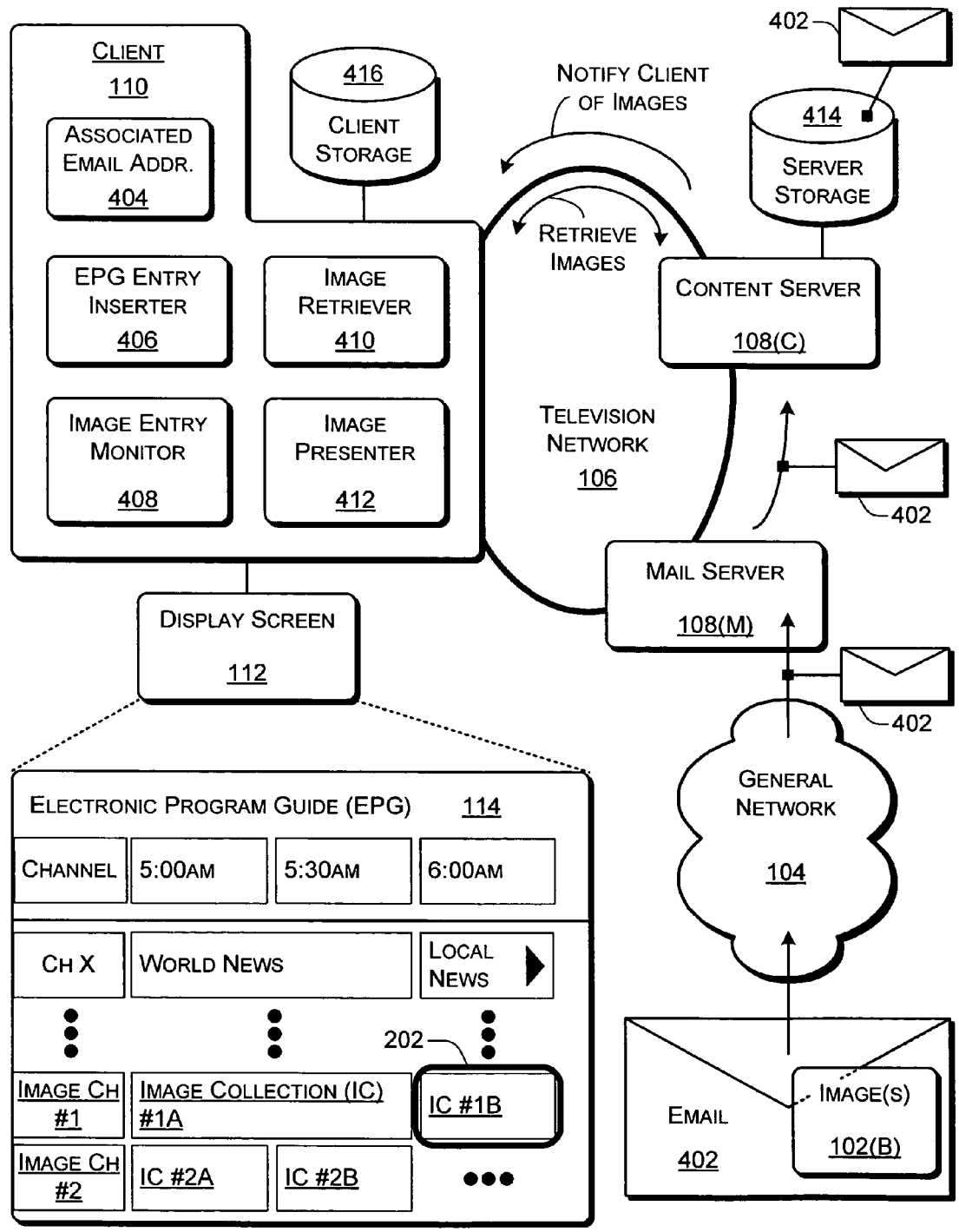
FIG. 4 is a block diagram illustrating an example of image access via the EPG in conjunction with an email.

FIG. 4 is a block diagram illustrating an example of image access via EPG 114 in conjunction with an email 402. Images 102(B) that are emailed 402 toward client 110 become accessible to users of client 110 via EPG 114 as presented on display screen 112.

Along with television-channel-related entries, EPG 114 displays image-related entries. These entries include image channels #1 and #2 as well as their corresponding image collection (IC) cells. Specifically, image channel #1 corresponds to an IC #1A cell and an IC #1B cell, and image channel #2 corresponds to an IC #2A cell and IC #2B cell. Although only two image channels are displayed with EPG 114, a given EPG may actually include one, two, three or more image channels at any time, depending on the number of received images 102 and/or the number of addresses from which they originated as is described further below.

In a described implementation, client 110 is associated with an email address 404. For example, associated email address 404 may be similar to "CustomerName@TelevisionServiceProvider.com". Client 110 includes an EPG entry inserter 406, an image entry monitor 408, an image retriever 410, and an image presenter 412. These components may be components stored on memory 118 (of FIG. 1) and functional in conjunction with processor 116. Operation of these components is described by way of the following email example.

In this email example, a third party has access to images 102(B) that the third party wishes to share with a user of client 110. The third party prepares email 402 (e.g., using a standard or specialized email application) at some device that is connected to general network 104. Email 402 comprises images 102(B). For example, email 402 may be (primarily) images 102(B) encapsulated as the payload of one or more packets, or email 402 may include (such as in an attachment) images 102(B). The destination address of email 402 corresponds to associated email address 404.

Email 402 is sent across general network 104 to a mail server 108(M). Mail server 108(M) handles email arriving from general network 104 for all or part of the total clients 110 that are coupled to television network 106. Mail server 108(M) forwards email 402 to content server 108(C). Although shown and described separately, content server 108(C) and mail server 108(M) may be co-located together and/or functioning as a single logical server. Content server 108(C) saves/stores email 402, including at least images 102(B) and an identification of email 402.

Content server 108(C) sends a message over television network 106 to client 110 that notifies client 110 of new images 102(B). This notification message is handled by EPG entry inserter 406. Generally, EPG entry inserter 406 inserts into EPG 114 an image entry representing the newly-arrived images 102(B).

Specifically, EPG entry inserter 406 creates an image entry that includes an indication of the images to which it provides access and adds this created entry to EPG 114. For example, a created entry may include the source address and/or associated sender of email 402 and/or a date of email 402. Although not so illustrated in FIG. 4, these indications may be presented as links within an image-related entry. In this example, the IC #1B cell is inserted into EPG 114 by EPG entry inserter 406 to provide access to images 102(B).

After EPG 114 is displayed on display screen 112, a user can maneuver a selector such as selector ring 202 to highlight an image-related entry. This movement and selection of a highlighted entry is monitored by image entry monitor 408. Image entry monitor 408, in particular, may be part of EPG application 120. As illustrated, the IC #1B cell is highlighted by selector ring 202. When a user selects the highlighted IC #1B cell, image entry monitor 408 detects the selection and activates image retriever 410.

Image retriever 410, in response to user selection of the IC #1B cell, retrieves images 102(B) that are associated therewith. Generally, image retriever 410 retrieves images 102(B) over television network 106 from server storage 414 via content server 108(C). Specifically, image retriever 410 formulates an image retrieval request communication and transmits it to content server 108(C) across television network 106. In response, content server 108(C) acquires images 102(B) from server storage 414 and sends them back to client 110 in an image delivery communication.

After delivery of images 102(B) to client 110 from content server 108(C), image retriever 410 forwards them to image presenter 412. Image presenter 412 presents images 102(B) on display screen 112. For example, image presenter 412 may present images 102(B) visually on display screen 112 using a slide show mechanism as illustrated in FIG. 2 (for images 102(A)).

In an alternative implementation, a message sent from content server 108(C) to client 110 that provides notice of newly-received images 102(B) may actually include images 102(B). Consequently, client 110 stores/saves images 102(B) at a client storage 416. Client storage 416 may be integral with client 110 or connected (by wire or wirelessly) to client 110. For example, client storage 416 may be a hard drive or flash memory that forms part of a set-top box, or it may be central storage for a home network. Regardless, in this alternative implementation, image retriever 410 retrieves images 102(B) from client storage 416 when the IC #1B cell is selected by a user.

Image-related entries of EPG 114 may be organized in a myriad of manners. Additionally, image accessing that results from selecting differently organized and/or different types of image-related entries may differ in dependence on such organization and/or types. For example, all incoming images may be placed in association with the same image channel or even in the same image cell. However, an example of a more sophisticated approach to an organization for image-related entries is described below.

In this described example, each particular image channel corresponds to a particular source address for emails 402 having images. Hence, image channel #1 may be from a grandparent's son while image channel #2 may be from the grandparent's daughter. Images 102(B) accompanying each respective arriving email 402 are associated with a new respective IC cell in an image channel determined by the source address of the arriving emails 402.

Code words used by the sender (e.g., in the subject field) of emails 402 may allow greater control by EPG entry inserter 406 for organizing image-related entries of EPG 114. For example, "grandson" in the subject field enables an EPG entry inserter 406 to place all images of a grandson by way of a given child (having a particular source email address) in association with the same IC cell, even if the images arrive in different emails.

Continuing with the described example, establishing a correspondence between image channels and source addresses of emails 402 facilitates greater flexibility regarding image access. For example, user selection of an image channel can cause client 110 to retrieve and present the images that are associated with all IC cells of the selected image channel. User selection of a single IC cell, on the other hand, can cause client 110 to retrieve and present those images that are associated with that selected IC cell.

Figure 5:
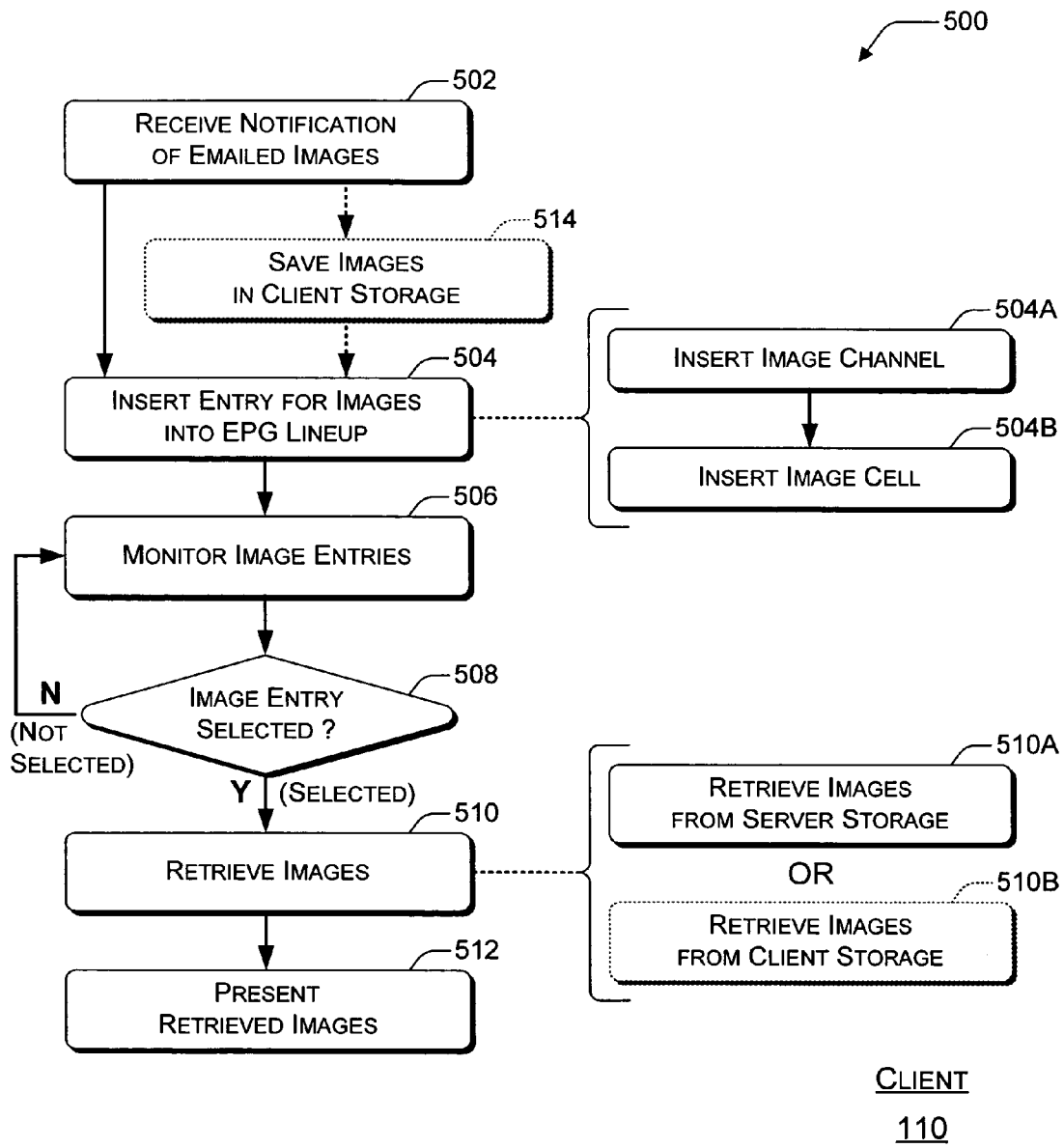
FIG. 5 is a flow diagram that illustrates an example of a method for accessing images via an EPG in conjunction with an email.

FIG. 5 is a flow diagram 500 that illustrates an example of a method for accessing images via an EPG in conjunction with an email. Flow diagram 500 includes six (6) primary blocks 502-512 and eleven (11) blocks total. Although the actions of flow diagram 500 may be performed in other environments and with a variety of hardware and software implementations, FIGS. 1 and 4 are used in particular to illustrate certain aspects and examples of the method. For example, a client 110 may perform the actions of blocks 502-512.

At block 502, notification of emailed images is received. For example, EPG entry inserter 406 of client 110 may receive a notification message of new images 102(B), which have been received with email 402, from a server 108 such as content server 108(C). If the notification message includes the emailed images, the action(s) of block 514 are performed. At block 514, the received emailed images are saved in client-side storage. For example, client 110 may save emailed images 102(B) at client storage 416.

At block 504, an entry for the new images is inserted into an EPG lineup. For example, EPG entry inserter 406 may insert into EPG 114, along with the preexisting television channels of EPG 114, an image-related entry that is associated with and linked to emailed images 102(B). More specifically, at block 504A an image channel is inserted, and at block 504B an image cell is inserted.

For example, if a source address of email 402 has not been previously encountered, then EPG entry inserter 406 may create a new image channel corresponding to the new source address. EPG entry inserter 406 may then also create a new image cell of a new IC for images 102(B) within the newly-inserted image channel. This new image cell is therefore associated with the emailed images 102(B). If, on the other hand, the source address of email 402 has been previously encountered, then EPG entry inserter 406 may create a new IC cell to be associated with the new images and insert the new IC cell into an existing image channel corresponding to the existing source address.

At block 506, image entries are monitored. For example, image entry monitor 408 may monitor image-related entries of EPG 114 by tracking a selector such as selector ring 202 and awaiting a user selection. At block 508, it is detected if an image entry has been selected. For example, image entry monitor 408 may detect if a user selects a highlighted image entry such as the IC #1B cell. If no image entry has been selected, then monitoring continues at block 506 as long as image-related entries are present on a displayed EPG 114. If, on the other hand, an image entry has been selected (as detected at block 508), flow diagram 500 continues with block 510.

At block 510, images associated with the selected image entry are retrieved. For example, image retriever 410 may retrieve images 102(B) that are associated with the selected IC #1B cell from a storage location. More specifically, at block 510A the associated images are retrieved from server storage. For example, image retriever 410 may retrieve images 102(B) that are associated with the selected IC #1B cell from server storage 414. Alternatively, if the emailed images were saved in client storage at block 514, then at block 510B the associated images are retrieved from client storage. For example, image retriever 410 may retrieve images 102(B) that are associated with the selected IC #1B cell from client storage 416.

At block 512, the retrieved images are presented. For example, image presenter 412 may acquire the retrieved images 102(B) that are associated with the selected IC #1B cell from image retriever 410 and present the retrieved images 102(B) on display screen 112 (e.g., using a slide show mechanism).

Image Access via General Television Applications in conjunction with Searches

Figure 6:
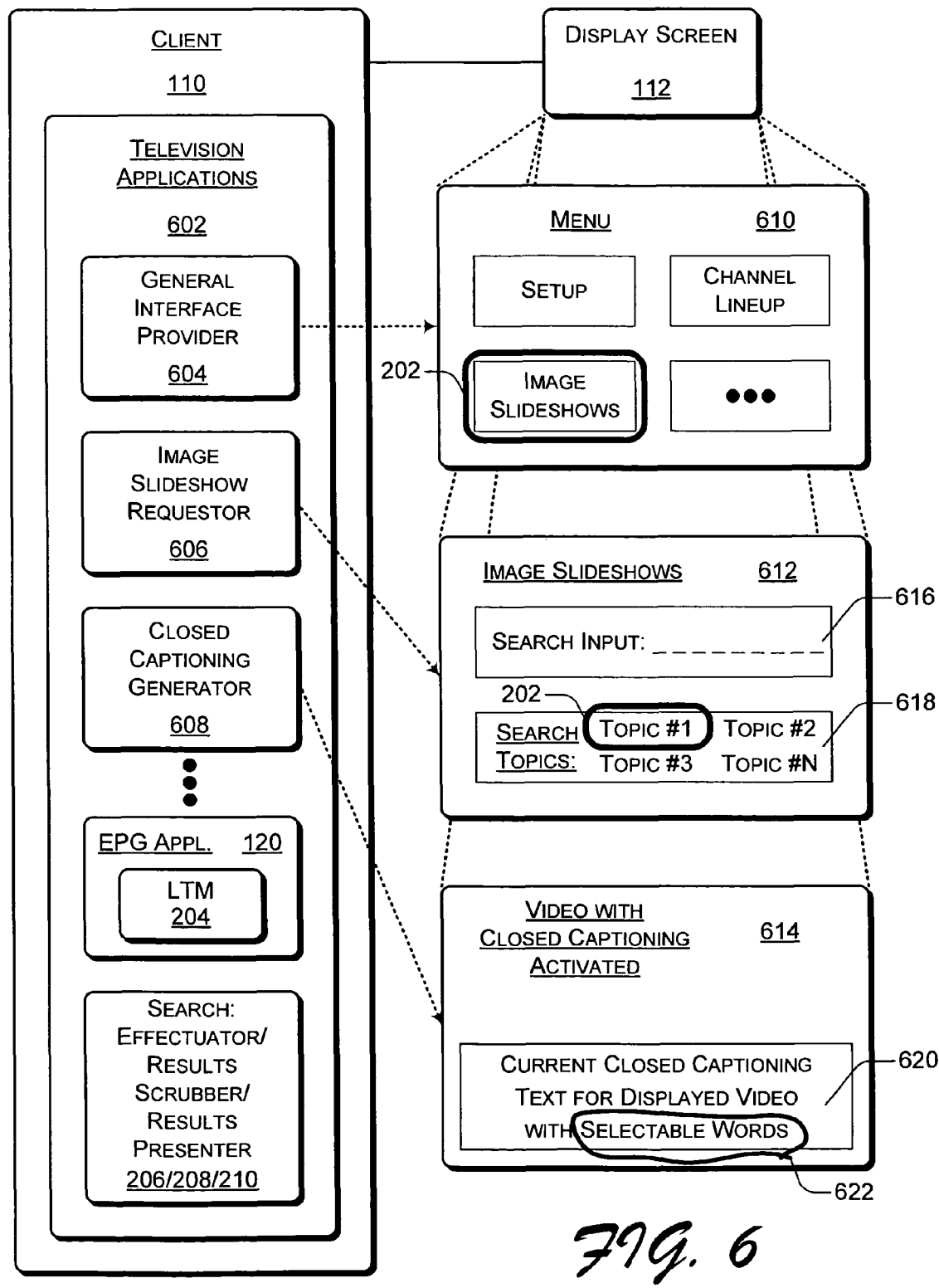
FIG. 6 is a block diagram illustrating examples of image access via general television applications in conjunction with a search.

FIG. 6 is a block diagram illustrating examples of image access via general television applications 602 in conjunction with a search. Client 110 includes general television applications 602. As illustrated, television applications 602 include a general interface provider 604, an image slideshow requestor 606, and a closed captioning generator 608, as well as EPG application 120. Client 110 is coupled to (e.g., connected to, integral with, etc.) display screen 112. Different views 610, 612, and 614 that may be presented to a user on display screen 112 by television applications 602 are also shown.

An example of image access via an EPG 114 in conjunction with a search is described above with particular reference to FIGS. 2 and 3. To facilitate a description of general television applications 602, some component(s) of FIGS. 1 and 2 are reproduced in FIG. 6. For example, an EPG application 120 includes link target monitor (LTM) 204. When a link target is selected by a user, as detected by link target monitor 204, the search target (e.g., keyword) of the selected link target is used for the search by a general search component 206/208/210. As described in greater detail above, search effectuator 206, search results scrubber 208, and scrubbed results presenter 210 use the search target to attain search results, to scrub the search results, and to present the scrubbed search results on display screen 112. However, as described further below, such image access is not limited to EPG-related views and/or components.

In a described implementation, a television-based device such as client 110 includes televisions applications 602. Television applications 602 present a particular view and/or provide a particular service to a user on an interactive and/or on a unilateral basis. Illustrated components include general interface provider 604, image slideshow requestor 606, and closed captioning generator 608. Although not explicitly illustrated, other types of general television applications 602 may be included as part of client 110 and may be involved in image accesses in conjunction with searches. These components may be components stored at memory 118 (of FIG. 1) and functional in conjunction with processor 116. Operation of these components is described by way of the following display screen view examples.

General interface provider 604 presents a general interface such as menu 610. Menu 610 (e.g., as a launch point) provides users access to and/or launches other television applications 602. As shown, such other television applications 602 may include a setup application, a channel lineup guide application, an image slideshows application (e.g., image slideshow requestor 606), and so forth. A user may activate these other television applications 602 from menu 610 using an input mechanism (e.g., a selector ring 202).

Image slideshow requestor 606 presents an image slideshow request interface such as image slideshows 612. Image slideshows 612 includes two different search parameter input regions 616 and 618. These two search parameter input regions 616 and 618 include a search input region 616 and a search topics region 618. Search input region 616 enables a user to input a search target (e.g., by inputting a subject character-by-character through typing with a keyboard through character indication with a remote, etc.). Search results responsive to the input search target are then attained, scrubbed, and presented.

Search topics region 618 of image slideshows 612 includes a list of topics #1, #2, #3 . . . #n that a user may select (e.g., using a selector ring 202) to indicate a search target. Search results responsive to the selected topic are then attained, scrubbed, and presented. The selected topics as presented in search topics region 618 may be determined, for example, based on search targets that are selected and/or manually input by other users and are therefore of contemporary interest.

Closed captioning generator 608 generates closed captioning as shown for video with closed captioning activated 614. The video with closed captioning activated view 614 of display screen 112 includes closed captioning zone 620. Closed captioning zone 620 includes current closed captioning text for displayed video with selectable words. In other words, a user may select displayed words from closed captioning zone 620 to be used as a search target. The selectable words may be any words in closed captioning zone 620 or a specially denoted (e.g., with color, underlining, etc.) subset thereof. The selection may accomplished by circling 622 the words, by highlighting the words, and so forth.

Thus, general television applications 602 may be enabled to serve as a launching point for searches that result in image presentations. In other words, different views presented and/or services provided by television applications 602 may afford a user an opportunity to indicate a search target. Such search target indications may be made by manual character input, by topic selection, by text selection, and so forth. The indicated search target is then used as a keyword or similar focus of a search by search effectuator 206. The search results attained by search effectuator 206 are thereafter scrubbed by search results scrubber 208. The scrubbed search results are subsequently presented by scrubbed results presenter 210 on display screen 112 (e.g., using a slideshow format).

The devices, actions, aspects, features, procedures, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks can be modified, combined, rearranged, augmented, omitted, etc. in any manner to implement one or more systems, methods, devices, procedures, media, apparatuses, servers, clients, arrangements, etc. for specialized media presentation via an EPG (or a television application generally). Furthermore, although the description herein includes references to specific implementations, the illustrated and/or described implementations can be implemented in any suitable hardware, software, firmware, or combination thereof and using any suitable device architecture(s), television network element(s), EPG organization(s), television application(s) and/or display screen view(s) thereof, network protocol(s), media format(s), and so forth.

Furthermore, although the description above focuses on acquiring and presenting images, the implementations as described herein may alternatively be implemented with regard to media files generally, such as those having moving pictures and/or audio. For example, a scrubbed search result 216 (of FIG. 2) may reference media files, including images and/or moving pictures. Additionally, one or more media files may be emailed 402 (in FIG. 4) toward an email address 404 that is associated with a client 110 of a television network 106.

Implementations for specialized media presentation via an EPG (or a television application generally) may be described in the general context of processor-executable instructions. Generally, processor-executable instructions include routines, programs, protocols, objects, interfaces, components, data structures, etc. that perform and/or enable particular tasks and/or implement particular abstract data types. Specialized media presentation via an EPG (or a television application generally), as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A client device comprising:
   one or more processors;
   a memory;
   a search effectuator, maintained in the memory and executable on the one or more processors, to formulate a search request in response to selection of a link that is visually displayed in an electronic program guide (EPG) generated by an EPG application stored in the memory and implemented by the one or more processors of the client device, the search effectuator sending the search request to a search service;
   a link target monitor, maintained in the memory and executable on the one or more processors, to monitor a selector of the EPG to detect when the link visually displayed in the EPG is selected based on input from a user; and
   a search results scrubber, maintained in the memory and executable on the one or more processors, to scrub search results received in response to the search request by extracting images from the search results to provide a slideshow of the images extracted from the search results for presentation on an associated display screen.

2. The client device as recited in claim 1, further comprising a scrubbed results presenter that presents the slideshow of images extracted from the search results as scrubbed search results on the associated display screen.

3. The client device as recited in claim 2, wherein the scrubbed results presenter comprises a slideshow viewer for presenting the images extracted from the search results as the slideshow in response to selection of the link.

4. The client device as recited in claim 1, the search request comprising at least one word taken from the selected link used as a keyword in the search request.

5. The client device as recited in claim 1, wherein the search effectuator sends the search request to the search service through a television network to a television network server, which forwards the search request over a general network to the search service.

6. The client device as recited in claim 5, wherein:
   the general network comprises the internet, and the search service comprises a third party search engine; and
   the search effectuator formulates the search request in accordance with the third party search engine by including an indication that an image search is requested.

7. The client device as recited in claim 1, wherein the search results scrubber parses the search results according to image tags in the search results to extract the images from the search results.

8. The client device as recited in claim 7, wherein the search results scrubber transforms the parsed search results from a first format including images and text into a second format for presentation of the extracted images as the slideshow.

9. The client device as recited in claim 7, wherein the first format comprises a hypertext markup language (html) format, and the second format comprises an extensible markup language (xml) format.

10. An arrangement for media access via an electronic program guide (EPG) in conjunction with a search, the arrangement comprising:
  effectuation means, stored in memory and executable on one or more processors, for formulating a search request in response to selection of a link that is visually displayed in the EPG, the effectuation means transmitting the search request to a search service;
  monitor means, stored in memory and executable on one or more processors, for monitoring link targets of the EPG to detect when the link visually displayed in the EPG is selected by user input; and
  scrub means, stored in the memory and executable on the one or more processors, for extracting images from search results resulting from the search to produce scrubbed search results in an accessible format by extracting the images from the search results to provide a slideshow of the images extracted from the search results for presentation on an associated display screen.

11. The arrangement as recited in claim 10, further comprising:
  presentation means for presenting on the associated display screen the scrubbed search results as produced by the scrub means in the accessible format.

12. The arrangement as recited in claim 10, wherein the effectuation means comprises:
  formulation means for formulating the search request using at least part of a the selected link displayed in the EPG as a keyword in the search request.

13. The arrangement as recited in claim 10, wherein:
  the effectuation means comprises transmission means for transmitting the search request that is related to the selected link over a television network to a server, which forwards the search request to the search service; and
  the search request includes an indication to the search service that an image search is requested.

14. The arrangement as recited in claim 10, wherein the scrub means comprises:
  parse means for parsing the search results to identify image tags in the search results; and
  transformation means for transforming the parsed search results from a first format including images and text into a second format for presentation of the extracted images as the slideshow.

15. The arrangement as recited in claim 10, wherein the arrangement comprises at least one of:
  one or more processor-accessible storage media; or
  at least one device.

16. One or more processor-accessible storage media wherein the storage media is not transmission media, comprising processor-executable instructions that, when executed, direct a client device to perform actions comprising:
  generating, by the client device, an electronic program guide (EPG) displaying a plurality of television channel entries, the EPG comprising at least one link that is visually displayed in association with one of the television channel entries;
  receiving a selection of the at least one link;
  effectuating a search of a group of files responsive to the selection of the at least one link;
  receiving search results from the effectuated search, the search results in a first format; and
  scrubbing the search results in the first format to identify images or links to images in the search results to produce scrubbed search results in a second format by extracting the images from the search results to provide a slideshow of the images extracted from the search results for presentation on an associated display screens.

17. The one or more processor-accessible storage media as recited in claim 16, wherein the action of effectuating comprises actions of:
  formulating a search request using the selected at least one link to determine at least one keyword; and
  sending the search request to a search service with an indication that the search is an image search.

18. The one or more processor-accessible storage media as recited in claim 17, wherein:
  the at least one keyword comprises at least part of a name of an actor or an actress; and
  the action of sending comprises an action of sending the search request to the search service through a television network and over the internet.

19. The one or more processor-accessible storage media as recited in claim 16, wherein:
  the action of scrubbing comprises actions of:
    parsing the search results in the first format to identify image tags in the search results to produce parsed search results; and
    transforming the parsed search results from a first format including images and text to produce parsed and transformed search results comprising the images or links to images in the second format; and
  the processor-executable instructions, when executed, direct the client device to perform a further action comprising presenting the parsed and transformed search results on the display screen from a file in the second format.

20. The one or more processor-accessible storage media as recited in claim 16, wherein the scrubbed search results comprise uniform resource locators (URLs) for the images or links to images identified.

21. The one or more processor-accessible storage media as recited in claim 16, wherein:
  the scrubbed search results comprise multiple image files; and
  the processor-executable instructions, when executed, direct the client device to perform a further action comprising presenting the multiple image files on a display screen by employing a slideshow mechanism to display the multiple images as search results in response to the selection of the at least one link.

22. The one or more processor-accessible storage media as recited in claim 16, wherein the one or more processor-accessible media comprise one or more storage media.

23. A method comprising:
  displaying an electronic program guide (EPG) having at least one linked name that is visually displayed within the EPG;

monitoring a selector of the EPG to detect if the at least one linked name that is visually displayed is selected;

if the at least one linked name is selected:

effectuating a search with a search service using a search request, the search request comprising at least part of the at least one linked name as a search term for the search and an indication that an image search is requested;

receiving search results in a first format as a result of effectuating the image search;

identifying images in the search results in the first format to produce search results in a second format, the second format providing the images as a slideshow; and presenting the search results in the second format as the slideshow of the images on a display screen in response to selection of the at least one linked name.

24. The method as recited in claim 23, wherein the effectuating comprises:

sending the search request over the internet to a third party search engine comprising the search service.

25. The method as recited in claim 23, wherein the scrubbing comprises:

parsing the search results in the first format to extract images or links to images; and transforming the images or links to images to a second format for presentation as the slideshow.

26. A television-based client device comprising:

one or more processors;

a memory;

an electronic program guide (EPG) application, stored in the memory and executed on the one or more processors of the television-based client device, to generate an EPG to display a plurality of channel entries, the channel entries listing programs available for viewing through the television-based client device, the EPG visually displaying at least one selectable link in at least one channel entry;

a search effectuator, stored in the memory and executable on the one or more processors, to effectuate an image search in response to selection by a user of the at least one selectable link visually displayed in at least one channel entry as part of the EPG, the search effectuator formulating a search request based on the link selected by the user and sending the search request over a network to a search service, the search request comprising at least a portion of the selected link used as a keyword in the search request and an indication that an image search is requested;

a link target monitor, stored in the memory and executable on the one or more processors, to monitor a selector of the EPG to detect when the link that is visually displayed in the individual channel entry of the EPG is being selected based on input from the user;

a search results scrubber, stored in the memory and executable on the one or more processors, to scrub search results received in response to the search by extracting images from the search results based on image tags in the search results to provide a slideshow of the images extracted from the search results for presentation on an associated display screen; and a scrubbed results presenter for presenting the images extracted from the search results as the slideshow on the display screen in response to the link being selected.

* * * * *